US005899992A

United States Patent [19]
Iyer et al.

[11] Patent Number: 5,899,992
[45] Date of Patent: May 4, 1999

[54] SCALABLE SET ORIENTED CLASSIFIER

[75] Inventors: Balakrishna Raghavendra Iyer; Min Wang, both of San Jose, Calif.

[73] Assignee: International Business Machines Corporation, Armonk, N.Y.

[21] Appl. No.: 08/800,357

[22] Filed: Feb. 14, 1997

[51] Int. Cl.$^6$ .................................................. G06F 17/30
[52] U.S. Cl. ........................................ 707/7; 707/1; 707/5
[58] Field of Search ........................................ 707/1, 5, 7

[56] References Cited

PUBLICATIONS

Ganski, R. A., et al., "Optimization of Nested SQL Queries Revisited", Proceedings of Association for Computing Machinery Special Interest Group on Management of Data, May 27–29, 1987, pp. 23–33.

Muralikrishna, M., "Improved Unnesting Algorithms for Join Aggregate SQL Queries", Proceedings of the 18th International Conference on Very Large Data Bases, Aug. 23–27, 1992, pp. 91–102.

Quinlan, J.R., "Combining Instance–Based and Model–Based Learning", Machine Learning, Proceedings of the Tenth International Conference, Jun. 27–29, 1993, pp. 236–243.

Agrawal, R., "Database Mining: A Performance Perspective", IEEE Transactions on Knowledge and Data Engineering, vol. 5, No. 6, Dec. 1993, pp. 914–925.

Baru, C.K., et al., "DB2 Parallel Edition", IBM Systems Journal, vol. 34, No. 2, 1995, pp. 292–322.

Houtsma, M., et al., "Set–Oriented Mining for Association Rules in Relational Databases", Eleventh International Conference on Data Engineering, Mar. 6–10, 1995, pp. 25–33.

Bhargava, G., et al., "Hypergraph based reorderings of outer join queries with complex predicates", Proceedings of the 1995 ACM SIGMOD, International Conference on Management of Data, May 23–25, 1995, pp. 304–315.

Sarawagi, S., "Query Processing in Tertiary Memory Databases", Proceedings of the 21st International Conference on Very Large Data Bases, Sep. 11–15, 1995, pp. 585–596.

Sarawagi, S., et al., "Reordering Query Execution in Tertiary Memory Databases", Proceedings of the 22nd VLDB Conference, 1996, pp. 156–167.

Shafer, J., et al., "SPRINT: A Scalable Parallel Classifier for Data Mining", Proceedings of the 22nd VLDB Conference, 1996, pp. 544–555.

Mehta, M., et al., "SLIQ: A Fast Scalable Classifier for Data Mining", 5th International Conference on Extending Database Technology, Mar. 25–29, 1996, pp. 18–32.

Nguyen, T., et al., "Accessing Relational Databases from the World Wide Web", Proceedings ACM SIGMOD International Conference on Management of Data, Jun. 4–6, 1996, pp. 529–540.

*Primary Examiner*—Thomas G. Black
*Assistant Examiner*—Frantz Coby
*Attorney, Agent, or Firm*—Gates & Cooper

[57] ABSTRACT

A method, apparatus, and article of manufacture for a computer implemented scaleable set-oriented classifier. The scalable set-oriented classifier stores set-oriented data as a table in a relational database. The table is comprised of rows having attributes. The scalable set-oriented classifier classifies the rows by building a classification tree. The scalable set-oriented classifier determines a gini index value for each split value of each attribute for each node that can be partitioned in the classification tree. The scalable set-oriented classifier selects an attribute and a split value for each node that can be partitioned based on the determined gini index value corresponding to the split value. Then, the scalable set-oriented classifier grows the classification tree by another level based on the selected attribute and split value for each node. The scalable set-oriented classifier repeats this process until each row of the table has been classified in the classification tree.

21 Claims, 5 Drawing Sheets

SCALABLE SET ORIENTED CLASSIFIER

BACKGROUND OF THE INVENTION

1. Field of the Invention.

This invention relates in general to computer implemented classifiers, and in particular to a scalable set oriented classifier.

2. Description of Related Art.

Information technology has developed rapidly over the last three decades. Many companies are known to have accumulated large volumes of critical business data on magnetic medium. It is widely believed that implicit in this business data are patterns that are valuable but not easy to discern.

Data mining is the process of extracting valid, previously unknown, and ultimately comprehensible information from large databases and using it to make crucial business decisions. The extracted information can be used to form a prediction or classification model or to identify relations between rows of a database table.

The classification problem is one in which a large data set (i.e., a training set), consisting of many examples, must be classified. Each example is a row of a table with multiple attributes. Also, each example is tagged with a class label identifying a class on which the examples in the training set are to be classified. The objective of classification is to develop a classifier based on the examples in the training set. The classifier contains a description (model) for each class. The model is used to classify future data for which the class labels are unknown. See L. Breiman et. al., *Classification and Regression Trees*, Wadsworth, Belmont, 1984, [hereinafter Breiman]; J. Ross Quilan, *C4.5: Programs for Machine Learning*, Morgan Kaufman, 1993, [hereinafter Quilan]; S. K. Murthy, *On Growing Better Classification trees from Data*, Ph.D. thesis, The Johns Hopkins University, 1995, [hereinafter Murthy]; J. Catlett, *Megainduction: Machine Learning on Very Large Databases*, Ph.D. thesis, University of Sydney, 1991, [hereinafter Catlett]; each of which is which is incorporated by reference herein.

Improving quality of results and scalability for large data sets are the two problems to solve for classification. Quality is known to be domain specific (e.g., insurance fraud and target marketing). However, there is a need for a generic solution to the problem of scalability.

Although disk and CPU prices are plunging, the volume of data available for analysis is immense. It may not be assumed data is memory resident. Hence, the practical research thrust is for classifiers that are scaleable and accurate. A classifier should scale well, that is, the classifier should work well even if the training set is large and overflows main memory. In data mining applications, it is common to have training sets with several million examples. It is observed in M. Mehta, R. Agrawal, and J. Rissanen, *SLIQ: A Fast Scaleable Classifier for Data Mining*, Proc. of the Fifth Int'l Conference on Extending Database Technology, Avignon, France, March 1996, [hereinafter Mehta], which is incorporated by reference herein, that all previously known classification methods do not scale well. Moreover, traditionally, data access has followed "a row at a time" paradigm and scalability has been addressed individually for each operating system, hardware platform, and architecture. Mehta; J. C. Shafer, R. Agrawal, M. Mehta, *SPRINT: A Scaleable Parallel Classifier for Data Mining*, Proc. of the 22nd International Conference on Very Large Databases, Mumbai (Bombay), India, September 1996, [hereinafter Shafer]; *IBM Intelligence Miner User's Guide*, version 1, Document No. SH12-6213-00, IBM Germany, July 1996, [hereinafter IM User's Guide]; each of which is which is incorporated by reference herein.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented scaleable set-oriented classifier. In accordance with the present invention, the scalable set-oriented classifier stores set-oriented data as a table in a relational database. The table is comprised of rows having attributes. The scalable set-oriented classifier classifies the rows by building a classification tree. The scalable set-oriented classifier determines a gini index value for each split value of each attribute for each node that can be partitioned in the classification tree. The scalable set-oriented classifier selects an attribute and a split value for each node that can be partitioned based on the determined gini index value corresponding to the split value. Then, the scalable set-oriented classifier grows the classification tree by another level based on the selected attribute and split value for each node. The scalable set-oriented classifier repeats this process until each row of the table has been classified in the classification tree.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
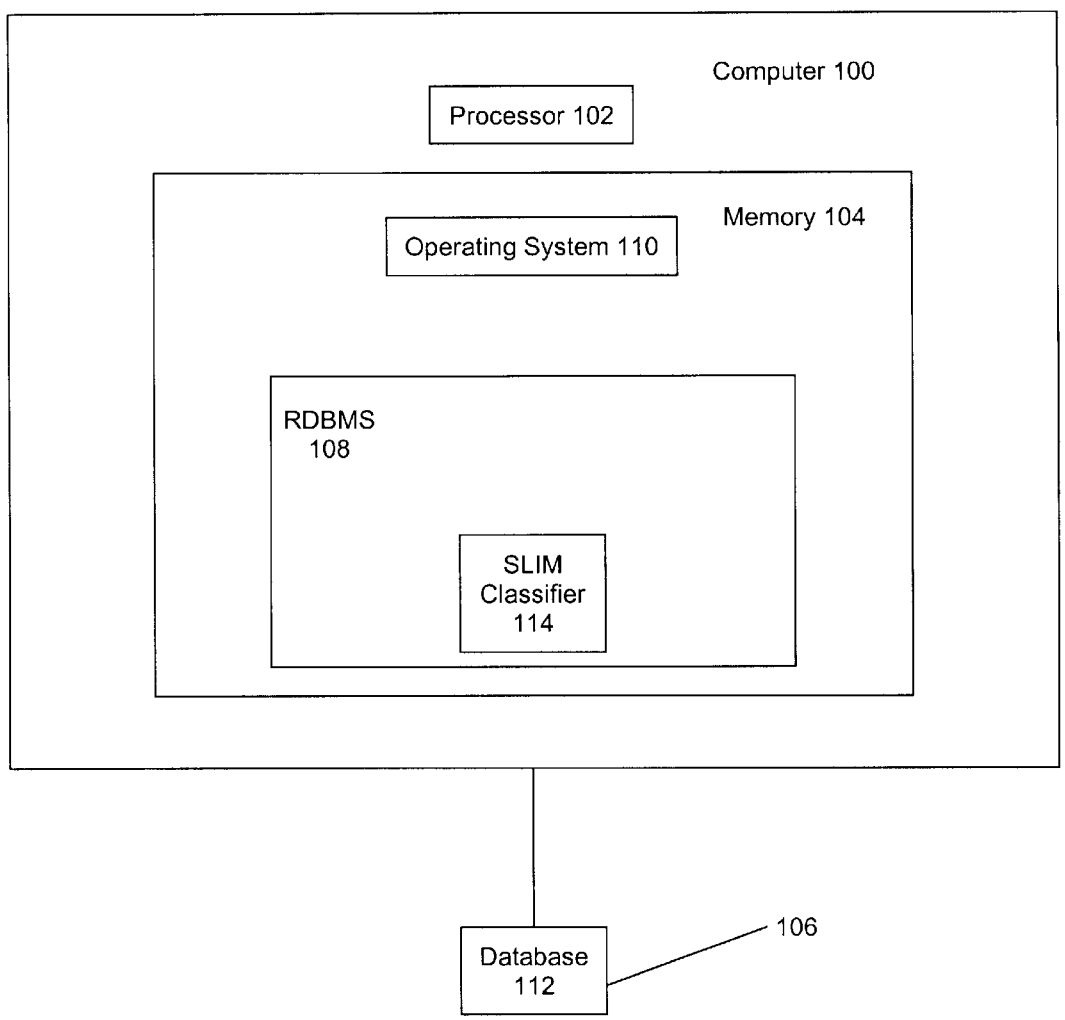
FIG. 1 is a block diagram of an exemplary hardware environment of the preferred embodiment of the present invention.

FIG. 1 is a block diagram illustrating an exemplary hardware environment used to implement the preferred embodiment of the invention. In the exemplary environment, a computer 100 is comprised of one or more processors 102, random access memory (RAM) 104, and assorted peripheral devices. The peripheral devices usually include one or more fixed and/or removable data storage devices 106, such as a hard disk, floppy disk, CD-ROM, tape, etc. Those skilled in the art will recognize that any combination of the above components, or any number of different components, peripherals, and other devices, may be used with the computer 100.

The present invention is typically implemented using relational database management system (RDBMS) software 108, such as the DB2 product sold by IBM Corporation, although it may be implemented with any database management system (DBMS) software. The RDBMS software 108 executes under the control of an operating system 110, such MVS, AIX, OS/2, WINDOWS NT, WINDOWS, UNIX, etc. Those skilled in the art will recognize that any combination of the above software, or any number of different software, may be used to implement the present invention.

The RDBMS software 108 receives commands from users for performing various search and retrieval functions, termed queries, against one or more databases 112 stored in the data storage devices 106. In the preferred embodiment, these queries conform to the Structured Query Language (SQL) standard, although other types of queries could also be used without departing from the scope of the invention. The queries invoke functions performed by the RDBMS software 108, such as definition, access control, interpretation, compilation, database retrieval, and update of user and system data.

Generally, the RDBMS software 108, the SQL queries, and the instructions derived therefrom, are all tangibly embodied in or readable from a computer-readable medium, e.g. one or more of the data storage devices 106 and/or data communications devices coupled to the computer. Moreover, the RDBMS software 108, the SQL queries, and the instructions derived therefrom, are all comprised of instructions which, when read and executed by the computer 100, causes the computer 100 to perform the steps necessary to implement and/or use the present invention.

SLIM Classifier

One application of the RDBMS 108 is known as the Intelligent Miner(IM) data mining application offered by IBM Corporation and described in IM User's Guide. The IM is a product consisting of inter-operable kernels and an extensive pre-processing library. The current IM kernels are:

Associations
Sequential patterns
Similar time sequences
Classifications
Predicting Values
Clusters In data mining, sometimes referred to as advanced data analysis, a frequently used kernel function is "classification". This classification kernel function is fundamental and many other kernels can be reduced to it. J. H. Friedman, *Flexible Metric Nearest Neighbor Classification*, Stanford University Technical Report, 1994, [hereinafter Friedman], which is incorporated by reference herein.

The scalable set-oriented classifier 114 of the present invention resorts to proven scalable database technology to provide a generic solution to the classification problem of scalability. The present invention provides a scalable model for classifying rows of a table within a classification tree. The scalable set-oriented classifier 114 is called the Scalable Supervised Learning Irregardless of Memory (SLIM) Classifier 114. Not only is the SLIM classifier 114 scalable in regions where recently published classifiers are not, but by virtue of building on well known set-oriented database management system (DBMS) primitives, the SLIM classifier 114 instantly exploits several decades of database research and development. The present invention rephrases classification, a data mining method, into analysis of data in a star schema, formalizing further the interrelationship between data mining and data warehousing.

A description of a prototype built using IBM's DB2 product as the RDBMS 108, and experimental results for the prototype are discussed below. Generally, the experimental results indicate that the DB2-based SLIM classifier 114 has desirable properties associating it with linear scalability.

The SLIM classifier 114 is built based on a set-oriented access to data paradigm. The SLIM classifier 114 uses Structured Query Language (SQL), offered by most commercial RDBMS 108 vendors, as the basis for the method. The SLIM classifier 114 is based on well known database methodologies and lets the RDBMS 108 automatically handle scalability. As a result, the SLIM classifier 114 will scale as long as the database scales.

The SLIM classifier 114 leverages the Structured Query Language (SQL) Application Programming Interface (API) of the RDBMS 108, which exploits the benefits of many years research and development pertaining to:

(1) scalability
(2) memory hierarchy
(3) parallelism ([18])
(4) optimization of the executions([16])
(5) platform independence
(6) client server API ([17]).

See S. Sarawagi, *Query Processing in Tertiary Memory Databases*, VLDB 1995, [hereinafter Sarawagi]; S. Sarawagi and M. Stonebraker, *Benefits of Reordering Execution in Tertiary Memory Databases*, VLDB 1996, [hereinafter Stonebraker]; G. Bhargava, P. Goel, and B. Iyer, *Hypergraph Based Reordering of Outer Join Queries with Complex Predicates*, SIGMOD 1995, [hereinafter Bhargava]; T. Nguyen and V. Srinivasan, *Accessing Relational Databases from the World Wide Web*, SIGMOD 1996, [hereinafter Goel]; C. K. Baru et. al., *DB2 Parallel Edition*, IBM Systems Journal, Vol. 34, No 2, 1995, [hereinafter Baru]; each of which is which is incorporated by reference herein.

Overview

A simple illustration of a training set is shown in Table 1 below:

TABLE 1

| Training Set | | |
| --- | --- | --- |
| salary | age | credit rating |
| 65K | 30 | Safe |
| 15K | 23 | Risky |
| 75K | 40 | Safe |
| 15K | 28 | Risky |
| 100k | 55 | Safe |
| 60K | 45 | Safe |
| 62K | 30 | Risky |

The rows of Table 1 (also known as relations or tuples) reflect the past experience of an organization extending credit. The salary and age columns of Table 1 represent attributes of the examples, and the credit rating column of Table 1 represents a class that will be used to classify the examples.

Figure 2:
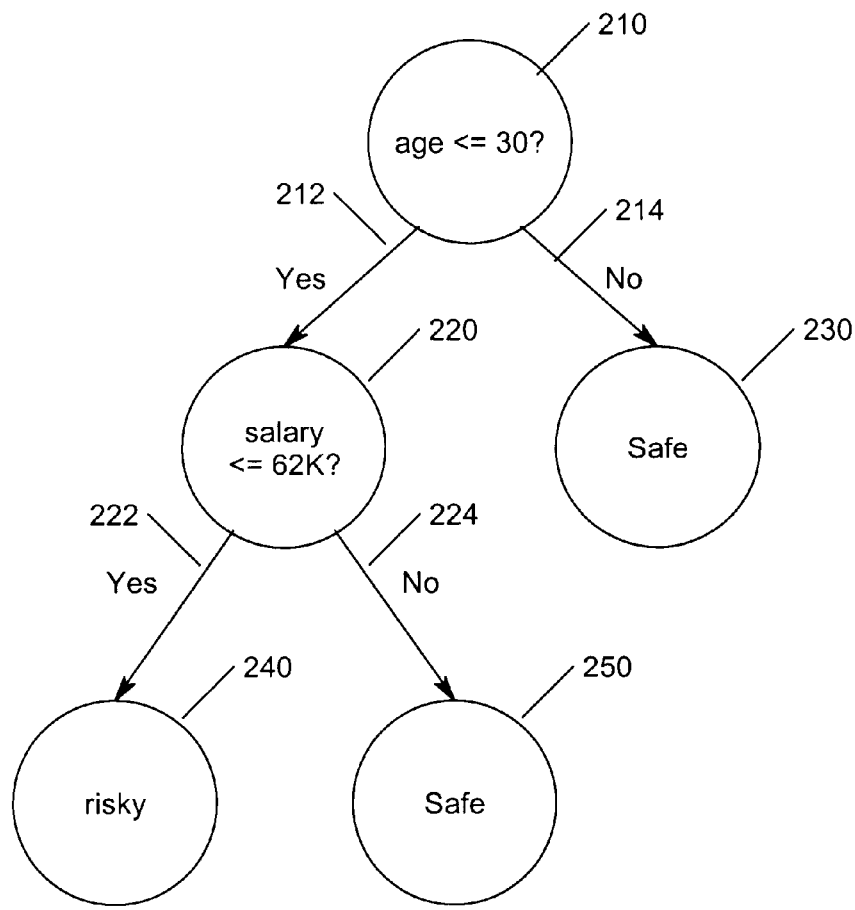
FIG. 2 illustrates a classification tree.

From the examples, the SLIM classifier 114 generates a classification tree 200 as illustrated in FIG. 2. The SLIM classifier 114 generates the classification tree 200 to classify the examples in the training set based on the credit rating class. The credit rating class can have values of either "safe" or "risky." The classification tree 200 has a root node 205 with decision "age<=30". When the age attribute of an example is less than or equal to 30, branch 212 is followed to node 220 with decision "salary<=62K". When the salary attribute of the example is less than or equal to 62K, branch 222 is followed to leaf node 240. Leaf node 240 indicates that an example whose age attribute is less than or equal to 30 and whose salary attribute is less than or equal to 62K falls into the risky class. When the salary attribute of the example is greater than 62K, branch 224 is followed to leaf node 240 that indicates that the example falls into the risky class. When the age attribute of a row is greater than 30, branch 214 is followed to node 230, which is a leaf node that indicates the example falls into the safe class. Additionally, when the age attribute of an example is greater than 30, branch 214 is followed to leaf node 230 that indicates the example falls into the safe class.

A classification tree 200 is built by the SLIM classifier 114 in two phases: a growth phase and a pruning phase. In the growth phase, the tree is built by recursively partitioning the data in the training set until each partition is either "pure" (all members belong to the same class) or sufficiently small (a parameter set by a user). Each node in the classification tree 200 that contains a decision (i.e., split test) reflects the partitioning that has occurred. The form of the split test that is used to partition the data in the classification tree depends on the type of the attribute used in the split test. Split tests for a numerical attribute A are of the form value(A)≦x, where x is a value in the domain of A. Split tests for a categorical attribute A are of the form value(A) ∈ S, where S is a subset of the domain of A. The SLIM classifier 114 uses a classification tree 200 with binary split tests as described in Mehta and Shafer. One skilled in the art would recognize that the classification tree need not be binary. After the classification tree 200 has been fully grown, it is pruned to remove the noise to obtain the final classification tree 200. The pruning method used by the present invention is the one described in Shafer.

The growth phase is computationally more expensive than the pruning phase. During the growth phase, the SLIM classifier 114 accesses the training set multiple times; while during the pruning phase, the SLIM classifier 114 only accesses the fully grown classification tree 200. Therefore, the SLIM classifier 114 focuses on the growth phase. The following pseudocode provides an overview of the growth phase performed by the SLIM classifier 114:

GrowTree (TrainingSet DETAIL)
  Initialize tree T, with all rows of the DETAIL table in the root;
  while not(all leafs in T are STOP nodes) {for each attribute i,
    form the dimension table $DIM_i$;
    evaluate gini index for each non-STOP leaf at each split value with respect to attribute i;
  for each non-STOP leaf,
    get the overall best split value for it;
  partition each row and grow the tree for one more level according to the best split value;
  mark all small or pure leafs as STOP nodes;}
  return T;

First, the SLIM classifier 114 initializes a DETAIL table, containing a row for each example in the training set, and the classification tree 200. Then, until each of the nodes is pure or sufficiently small, the SLIM classifier 114 performs the following procedure. First, for each attribute of an example, a $DIM_i$ table is generated. Next, a gini index value is determined for each distinct value (i.e., split value) of each attribute in each leaf node that is to be partitioned. Then, the split value with the lowest gini index value is selected for each leaf node that is to be partitioned for each attribute i. The best split value for each leaf node that is to be partitioned in the classification tree 200 is determined by choosing the attribute with a split value that has the lowest corresponding gini index value for that leaf node. After the best split value is determined, the classification tree 200 is grown by another level. Finally, the nodes that are pure or sufficiently small are marked as "STOP" nodes to indicate that they are not to be partitioned any further.

Data Structures

In Mehta, a method called SLIQ is proposed as a scalable classifier. The key data structure used in SLIQ is a class list whose size is linear in the number of examples in the training set. Shafer shows that since the class list must be memory-resident, it puts a hard limitation on the size of the training set that the method can handle.

Shafer proposes the new data structures: attribute list and histograms. Although it is no longer necessary for the attribute list to be memory-resident, the histograms must be in memory to insure good performance. While the size of a histogram for a numerical attribute may be small, the size of the histogram for a categorical attribute is linear in #distinct_value * #distinct_class, which could be large. Also, to perform the split in Shafer, a hash table is used. The size of such a hash table is in fact linear in the number of examples of the training set. When the hash table is too large to fit in memory, splitting is done in multiple steps. In each step, it appears the entire attribute list needs to be accessed. Therefore, Shafer's method does not achieve real linear scalability with respect to the number of examples in the training set. This was confirmed from the time per example measurement for the method. Instead of being flat, the method described by Shafer grows with the number of examples.

In the SLIM classifier 114, all information needed to evaluate the split values and perform the partition is stored in rows of a table in a relational database 150. Therefore, memory allocation issues need not be handled by the SLIM classifier 114 alone. The SLIM classifier 114 uses a data structure that relates the rows of the table to the growing classification tree 200. The SLIM classifier 114 assigns a unique identification number to identify each node in the classification tree 200. When loading the data from the training set into the relational database 150, the SLIM classifier 114 adds a leaf_num column to the DETAIL table. For each example in the training set, leaf_num indicates which leaf node in the current classification tree 200 to which it belongs. When the classification tree 200 grows, the leaf_num column is updated to indicate that the example is moved to a new node by applying the split in the current node.

There is a one-to-one mapping between leaf_num values and leaf nodes in the classification tree 200. If such a mapping is stored in the rows of the DETAIL table, it will be very expensive to access the corresponding leaf node for any row when the table is not memory resident. By examining the mapping carefully, it is seen that the cardinality of the leaf_num column is the same as the number of leaf nodes in the classification tree, which is not huge at all, regardless of the size of the training set. Therefore, the mapping is stored indirectly in a leaf node list (LNL).

A LNL is a static array that is used to relate the leaf_num value in the table to the identification number assigned to the corresponding node in the classification tree 200. By using a labeling technique, the SLIM classifier 114 insures that at each tree growing stage, the nodes always have the identification numbers 0 through N−1, where N is the number of nodes in the tree. LNL[i] is a pointer to the node with identification number i. Now, for any row in the table, the SLIM classifier 114 can get the leaf node it belongs to from its leaf_num value and LNL at anytime, and, hence, get the information in the node (e.g. split test, number of examples belonging in this node, and the class distribution of examples belonging in this node).

To insure the performance of the SLIM classifier 114, LNL is the only data structure that needs to be memory resident. The size of LNL is equal to the number of nodes in the tree, which is not large at all and which can certainly be stored in memory all the time.

The Gini Index Formula

A splitting index is used to choose from alternative splits for each node. Several splitting indices have been proposed. The SLIM classifier 114 uses the gini index, originally proposed in Breiman. The SLIM classifier 114 uses the gini index, instead of another index, because in both Mehta and Shafer, it gave acceptable accuracy. It can be shown the accuracy of the SLIM classifier 114 is at least as good as those published in Mehta and Shafer.

For a data set S containing m examples from n classes, gini(S) is defined as:

$$gini(S) = 1 - \sum_{i=1}^{n} p_i^2$$

where $p_i$ is the relative frequency of class i in S. If a split divides S into two subset $S_1$ and $S_2$, whose size is $m_1$ and $m_2$ respectively, the index of the divided data $gini_{split}(S)$ is given by:

$$gini_{split}(S) = \frac{m_1}{m_2} gini(S_1) + \frac{m_2}{m} gini(S_2) \quad (2)$$

Computing the gini index is the most expensive part of the method, since to find the best split value for a node, the SLIM classifier 114 needs to evaluate the gini index value for each attribute at each possible split value for each non-STOP leaf node. The attribute containing the split value achieving the lowest gini index value is then chosen to split the node, as was done in Breiman.

Scalable Supervised Learning Irregardless of Memory (SLIM)

Figure 3:
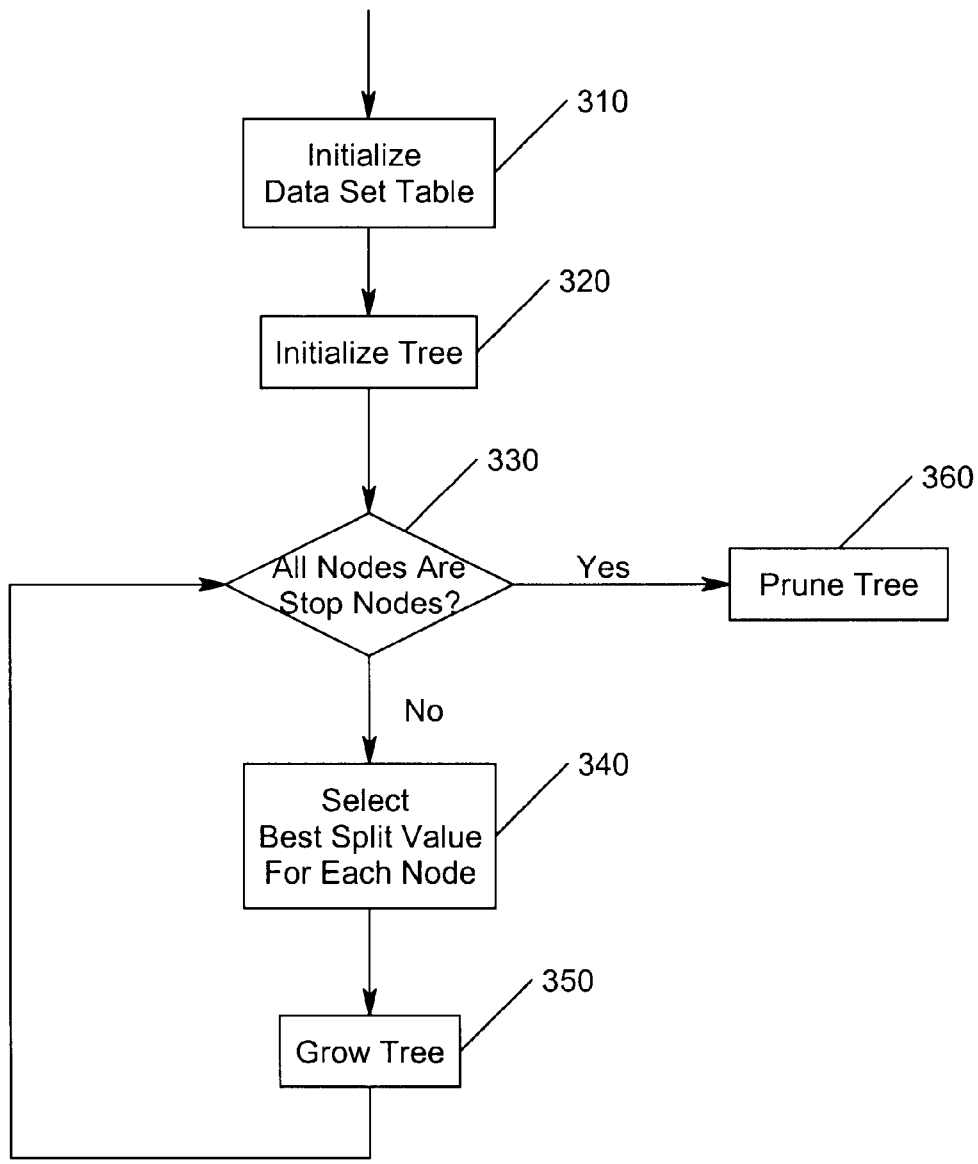
FIG. 3 is a flow diagram illustrating the general logic-of the SLIM classifier.

FIG. 3 is a flow diagram illustrating the general logic performed by the SLIM classifier 114. In step 310, the SLIM classifier 114 initializes the data set table. The examples of the training set are stored in a relational database 112 using a table with the following schema: DETAIL(attr$_1$, attr$_2$, ..., attr$_N$, class, leaf_num), where attr$_i$ is the ith attribute, class is the classifying attribute, and leaf_num indicates the leaf node in the classification tree 200 to which the row belongs. When the classification tree grows, the leaf_num value of each example in the training set is updated. Assuming that there are N other attributes besides the class attribute, the cardinality of the class attribute set is n. Table 2 illustrates the DETAIL table for the training set illustrated in Table 1:

TABLE 2

| DETAIL | | | |
|---|---|---|---|
| attr$_1$ | attr$_2$ | class | leaf_num |
| 65K | 30 | Safe | 0 |
| 15K | 23 | Risky | 0 |
| 75K | 40 | Safe | 0 |
| 15K | 28 | Risky | 0 |
| 100K | 55 | Safe | 0 |
| 60K | 45 | Safe | 0 |
| 62K | 30 | Risky | 0 |

In step 320, the classification tree 200 is initialized. At this stage, the classification tree 200 contains only a root node with all examples belonging to this root node. Step 330 is a decision step in which the SLIM classifier 114 determines whether all nodes in the classification tree 200 are STOP nodes. That is, the SLIM classifier 114 determines whether each node is either pure or sufficiently small. When all nodes are STOP nodes, the SLIM classifier 114 has completed classifying the training set and the classification tree 200 is pruned in step 360. Otherwise, the SLIM classifier 114 continues in step 340 to select the best split value for each non-STOP leaf node. The classification tree is grown in step 350.

Figure 4:
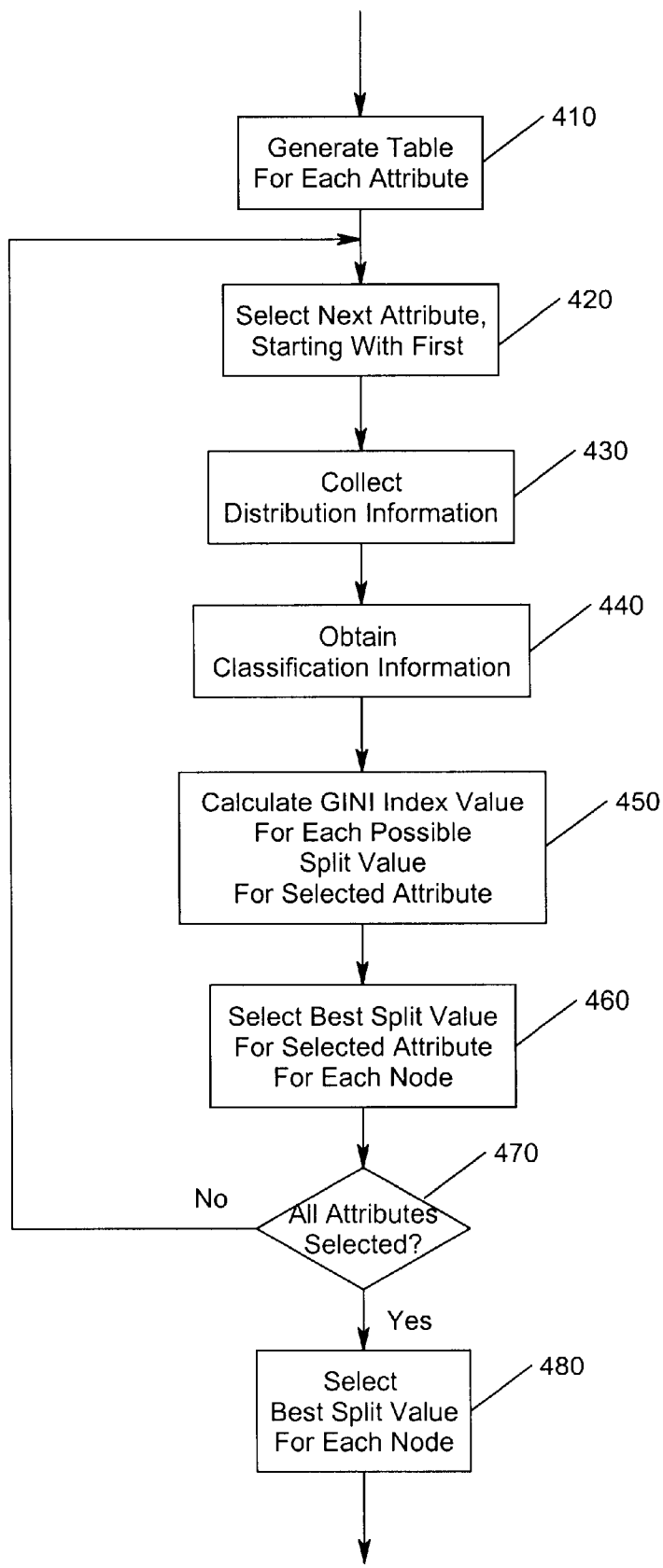
FIG. 4 is a flow chart illustrating the steps performed to select a best split value for each non-STOP leaf node.

FIG. 4 is a flow chart illustrating the steps performed to select the best split value for each non-STOP leaf node, as identified in step 340. In step 410, the SLIM classifier 114 generates a DIM$_i$ table for each attribute. In particular, once for every level of the tree, for each attribute attr$_i$, the SLIM classifier 114 generates a DIM$_i$ table with the schema DIM$_i$(leaf_num, class, attr$_i$, count) using the following simple select statement on the DETAIL table:

INSERT INTO DIM$_i$

SELECT leaf_num, class, attr$_i$, count(*)

FROM DETAIL

WHERE leaf_num≠STOP

GROUP BY leaf_num, class, attr$_i$

Although the number of distinct values in the DETAIL table could be huge, the maximal number of rows in DIM$_i$ is no greater than #leaf_in_tree * #distinct_values_on_attr$_i$ * #distinct_class, which is very likely to be of the order of several hundreds. In the case that #distinct_values_on_attr$_i$ is very big, preprocessing is suggested to further discretize it. Also, DETAIL could refer to data either in a table or a file (e.g., on magnetic tape). In case of a file, DETAIL resolves to an execution of a user defined function (e.g. fread in UNIX). D. Chamberlin, personal communication, [hereinafter Chamberlin].

When such dimension tables are formed for every dimension, it is easy to visualize the database schema as a star schema. Thus many innovations related to data warehousing are now applicable to improve performance. G. Larry, *Articles on Datawarehousing*, http://pwp.starnetinc.com/larryg/articles.html, 1996, [hereinafter Larry], which is incorporated by reference herein.

Once, the DIM$_i$ tables are generated, the SLIM classifier 114 determines the gini index value for each attribute at each possible split value of the attribute i by performing a series of SQL operations which only involve accessing the DIM$_i$ tables.

For one attribute i, its DIM$_i$ table may be created in one pass over the DETAIL table. It is straightforward to schedule one query per dimension (i.e., attribute). Completion time is still linear in the number of dimensions. Commercial DBMSs store data in essentially row major sequence. Thus, I/O efficiencies may be obtained if it is possible to create dimension tables for all attributes in one pass over the DETAIL table. Concurrent scheduling of the queries populating the DIM tables is the simple approach. Existing buffer management schemes that rely on I/O latency appear to synchronize access to the DETAIL table for the different attributes. The idea is that one query piggybacks onto another query's I/O data stream. Results from early experiments are encouraging. J. B. Sinclair, Rice University, personal communication, [hereinafter Sinclair].

It is also possible for SQL to be extended to ensure that not only I/O is optimized but also processor 102 utilization. Taking liberty with SQL standards, the following query is written as a proposed SQL operator:

```
SELECT FROM DETAIL
INSERT INTO DIM₁ {leaf_num, class, attr₁,
  count(*)
  WHERE predicate
  GROUP BY leaf_num, class, attr₁}
INSERT INTO DIM₂ {leaf_num, class, attr₂,
  count(*)
  WHERE predicate
  GROUP BY leaf_num, class, attr₂} . . .
INSERT INTO DIM_N {leaf_num, class, attr_N,
  count(*)
  WHERE predicate
  GROUP BY leaf_num, class, attrN}
```

The new operator forms multiple groupings concurrently, and may allow further optimization.

For each non-STOP leaf node in the tree, possible split values for attribute i are all distinct values of $attr_i$ among the examples which belong to this leaf node. For each possible split value, the SLIM classifier 114 needs to get the class distribution for the two parts partitioned by this value to compute the corresponding gini index. In step 430, the SLIM classifier 114 collects such distribution information in two tables, UP and DOWN.

The UP table with the schema. UP(leaf_num, attri, class, count) could be generated by performing a self-outer-join on $DIM_i$ using the following SQL query:

```
INSERT INTO UP
  SELECT d₁.node_num, d₁.attrᵢ, d₁.class, SUM(d₂. count)
  FROM (FULL OUTER JOIN DIMᵢ d₁, DIMᵢ d₂
  ON d₁. leaf_num=d₂.leaf_num AND d₂.attrᵢ<=d₁ attrᵢ
    AND d₁.class=d₂.class
  GROUP BY d₁.leaf_num, d₁.attri, d₁.class)
```

Similarly, the DOWN table could be generated by just changing the <=to> in the ON clause. Also, the SLIM classifier 114 can obtain the DOWN table by using the information in the leaf nodes and the count column in the UP table without doing join on DIMI again.

In case the outer-join operator is not supported, by performing simple set operations such as EXCEPT and UNION, the SLIM classifier 114 can form a view $DIM_i$ with the same schema as $DIM_i$ first. For each possible split value on attribute i and each possible class label of each node, there is a row in $DIM_i$ that gives the number of rows belonging to this leaf node that have such a value on attribute i and such a class label. Note that $DIM_i$ is a superset of $DIM_i$ and the difference between them are those rows with a count 0. After $DIM_i$ is generated, the SLIM classifier 114 performs a self-join on $DIM_i$ to create the UP table as follow:

```
INSERT INTO UP
  SELECT d₁.node_num, d₁.attri, d₁.class,
    SUM(d₂. count)
  FROM DIMᵢ d₁, DIMᵢ d₂
  WHERE d₁.leaf_num=d₂.leaf_num AND
    d₂.attrᵢ<=d₁.attrᵢ AND
    d₁ class=d₂.class
  GROUP BY d₁.leaf_num, d₁.attri, d₁.class
```

The UP and DOWN tables contain all the information the SLIM classifier 114 needs to compute the gini index at each possible split value for each current leaf node in the classification tree 200, but the SLIM classifier 114 needs to rearrange them in some way before the gini index is calculated.

In step 440, the SLIM classifier 114 obtains classification information. The following intermediate view could be formed for all possible classes k:

```
CREATE VIEW Cₖ_UP(leaf_num, attrᵢ, count) AS
  SELECT leaf_num, attrᵢ, count
  FROM UP
  WHERE class=k
```

Similarly, the SLIM classifier 114 defines view $C_K\_DOWN$ from the DOWN table.

In step 450, the SLIM classifier 114 calculates the gini index for each possible split value for attribute i. Now a view GINI_VALUE that contains all gini index values at each possible split value is generated. Taking the liberty with SQL syntax, the following query is written:

```
CREATE VIEW GINI-VALUE(leaf_num, attrᵢ, gini)
AS
  SELECT u₁.leaf_num, u₁.attrᵢ, f_gini
  FROM C₁_UP u₁, . . . , Cₙ_UP uₙ, C₁_DOWN d₁, . . . ,
    Cₙ_DOWN dₙ
  WHERE u₁.attrᵢ= . . . =uₙ. attrᵢ=d₁. attrᵢ= . . . =dₙ. attrᵢ
  AND u₁.leaf_num= . . . =uₙ.leaf_num=d₁.
    leaf_num= . . . =dₙ.leaf_num
``` where $f_{gini}$ is a function of $u_1.count, \ldots, u_n.count, d_1.count, \ldots, d_n.count$.

In step 460, for each non-STOP leaf node, the SLIM classifier 114 selects the best split value for attribute i. The SLIM classifier 114 creates a table with the schema MIN_GINI(leaf_num, attr_name, attr_value, gini):

```
INSERT INTO MIN_GINI
  SELECT leaf_num,: i, attrᵢ, min(gini)
```

Note the transformation for the table name $DIM_i$ to column value i and column name $attr_i$.

```
  FROM GINI_VALUE a
  WHERE a.gini=SELECT min(gini)
    FROM GINI_VALUE b
    WHERE a.leaf_num=b.leaf_num)
  GROUP BY leaf_num
```

The MIN_GINI table contains the best split value and the corresponding gini index value for each leaf node of the classification tree 200 with respect to attribute i.

The SLIM classifier 114 repeats the above procedure for all attributes. Once that is done, the MIN_GINI table contains the best split value for each non-STOP leaf node with respect to all attributes. Step 470 is a decision step in which the SLIM classifier 114 determines whether all attributes have been selected. If not all attributes have been selected, the SLIM classifier 114 continues at step 420 to perform the procedure for the remaining attributes. If all attributes have been selected, the SLIM classifier 114 continues at step 480. In step 480, the SLIM classifier 114 selects the best split value for each non-STOP leaf node. The overall best split value for each non-STOP leaf node is obtained from executing the following query:

```
CREATE VIEW BEST_SPLIT(leaf_num, attr_name,
  attr_value, gini)
AS
  SELECT leaf_num, attr_name, attr_value, min(gini)
  FROM MIN_GINI a
  WHERE a.gini=(SELECT min(gini)
    FROM MIN_GINI b
    WHERE a.leaf_num b.leaf_num)
  GROUP BY leaf_num
```

Categorical Attributes

For a categorical attribute i, the SLIM classifier 114 forms $DIM_1$ in the same way as for a numerical attribute. $DIM_i$ contains all the information the SLIM classifier 114 needs to compute the gini index for any subset splitting. In fact, It is an analog of the count matrix in Shafer, but formed with set-oriented operators.

A possible split is any subset of the set that contains all the distinct attribute values. If the cardinality of attribute i is m, the SLIM classifier 114 needs to evaluate the splits for all the $2^m$ subsets.

Those subsets and their related counts can be generated in a recursive way. The schema of the table that contains all the k-sets is $S_k\_IN(leaf\_num, class, v_1, v_2, \ldots, v_k, count)$. Obviously $DIM_i=S_1\_IN.S_k\_IN$ is then generated from $S_1\_IN$ and $S_{k-1}\_IN$ as follows:

INSERT INTO $S_k\_IN$
SELECT p.leaf_num, p.class, $p.v_1, \ldots, P.v_{k-1}$ $q.v_1$, p.count+q.count
FROM (FULL OUTER JOIN $S_{k-1}\_IN$ p, $S_1\_IN$ q
ON p.leaf_num=q.leaf_num AND
p.class=q.class AND
$q.v_1>p.v_{k-1}$)

The SLIM classifier 114 generates the $S_k\_OUT$ table in a similar way as the SLIM classifier 114 generates the DOWN table from the UP table. Then the SLIM classifier 114 treats $S_k\_IN$ and $S_k\_OUT$ exactly as DOWN and UP for numerical attribute to compute the gini index for each k-set split.

The SLIM classifier 114 does not need to evaluate all the subsets. The SLIM classifier 114 only needs to compute the k-sets for $k=1, 2, \ldots, \lfloor m/2 \rfloor$ and thus saves time.

Partitioning

Figure 5:
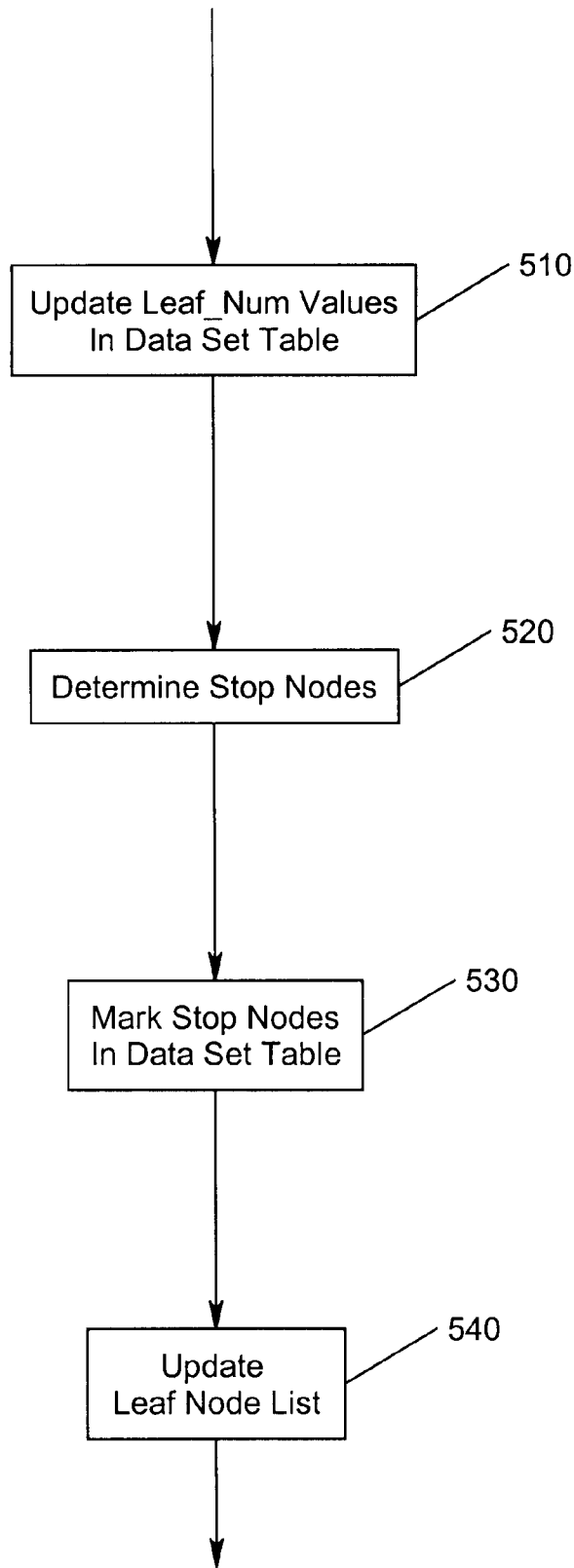
FIG. 5 is a flow diagram illustrating the steps performed to grow the classification tree 200.

Once the best split values have been found for each leaf node, the leaf nodes are split into two child nodes. FIG. 5 is a flow diagram illustrating the steps performed to grow the classification tree 200 as identified in step 350. In step 510, the SLIM classifier 114 updates the leaf_num values in the DETAIL table as follows:

UPDATE DETAIL
SET leaf_num=partition($attr_1, \ldots, attr_N$, class, leaf_num)

The following is pseudocode for the user defined function partition:

partition(row r).
Use the leaf_num value of r to locate the tree node which r belongs to through LNL;
Get the best split from node n;
Apply the split to r;
Return a new leaf_num according the result of the split test and update r in DETAIL;

The partition function applies the current tree to the original training set. If updating the whole DETAIL table is expensive, the update is avoided by just replacing leaf_num by the partition function in the statement forming $DIM_i$. Therefore, there is no need to store leaf_num in the DETAIL table. Instead, leaf_num can be computed from the attribute values of each row.

In step 520, the STOP nodes are determined. These are the nodes that are pure or sufficiently small. In step 530, the SLIM classifier 114 marks STOP nodes in the DETAIL table to indicate that these nodes are not to be partitioned further. In step 540, the SLIM classifier 114 updates the leaf node list.

EXAMPLE

The SLIM classifier 114 is illustrated by an example. The example training set is the same as the data in Table 1. Initially, the SLIM classifier 114 loads the training set and initializes the classification tree 200 and the leaf node list. The DETAIL table is shown in Table 2 above.

Next, the SLIM classifier 114 finds the best split value for the root node. To do this, the SLIM classifier 114 evaluates the gini index values for each split value of each attribute. For illustration purposes, the procedure for finding the best split value will be shown using the salary attribute.

First, a dimension table is generated for the salary attribute. Table 3 illustrates a sample $DIM_i$ table for the salary attribute.

TABLE 3

| | $DIM_i$ | | |
|---|---|---|---|
| leaf_num | $attr_1$ | class | count |
| 0 | 15 | 2 | 2 |
| 0 | 60 | 1 | 1 |
| 0 | 62 | 2 | 1 |
| 0 | 65 | 1 | 1 |
| 0 | 75 | 1 | 1 |
| 0 | 100 | 1 | 1 |

Second, in order to be able to generate the UP and DOWN tables, a $DIM_i$ table is generated. This example assumes that the outer join operation is not available. Table 4 illustrates a sample $DIM_i$ table.

TABLE 4

| | $Dim_i$ | | |
|---|---|---|---|
| leaf_num | $attr_1$ | class | count |
| 0 | 15 | 1 | 0 |
| 0 | 62 | 1 | 0 |
| 0 | 60 | 2 | 0 |
| 0 | 65 | 2 | 0 |
| 0 | 75 | 2 | 0 |
| 0 | 100 | 2 | 0 |
| 0 | 60 | 1 | 1 |
| 0 | 65 | 1 | 1 |
| 0 | 75 | 1 | 1 |
| 0 | 100 | 1 | 1 |
| 0 | 62 | 2 | 1 |
| 0 | 15 | 2 | 2 |

Third, the SLIM classifier 114 collects distribution information by generating the UP and DOWN tables. Tables 5 and 6 illustrate these tables.

TABLE 5

| | UP | | |
|---|---|---|---|
| leaf_num | $attr_1$ | class | count |
| 0 | 15 | 1 | 0 |
| 0 | 15 | 2 | 2 |
| 0 | 60 | 1 | 1 |
| 0 | 60 | 2 | 2 |
| 0 | 62 | 1 | 1 |
| 0 | 62 | 2 | 3 |
| 0 | 65 | 1 | 2 |
| 0 | 65 | 2 | 3 |
| 0 | 75 | 1 | 3 |
| 0 | 75 | 2 | 3 |
| 0 | 100 | 1 | 4 |
| 0 | 100 | 2 | 3 |

TABLE 6

DOWN

| leaf_num | $attr_1$ | class | ccount |
|---|---|---|---|
| 0 | 15 | 1 | 4 |
| 0 | 15 | 2 | 1 |
| 0 | 60 | 2 | 1 |
| 0 | 60 | 2 | 1 |
| 0 | 62 | 1 | 3 |
| 0 | 62 | 2 | 0 |
| 0 | 65 | 1 | 2 |
| 0 | 65 | 2 | 0 |
| 0 | 75 | 1 | 1 |
| 0 | 75 | 1 | 1 |
| 0 | 75 | 2 | 0 |

Fourth, the SLIM classifier 114 obtains classification information by generating the $C_k$ views. Tables 7–10 illustrate these views.

TABLE 7

$C_i$_UP

| leaf_num | $attr_1$ | count |
|---|---|---|
| 0 | 15 | 0.0 |
| 0 | 60 | 1.0 |
| 0 | 62 | 1.0 |
| 0 | 65 | 2.0 |
| 0 | 75 | 3.0 |
| 0 | 100 | 4.0 |

TABLE 8

$C_2$_UP

| leaf_num | $attr_1$ | count |
|---|---|---|
| 0 | 15 | 2.0 |
| 0 | 60 | 2.0 |
| 0 | 62 | 3.0 |
| 0 | 65 | 3.0 |
| 0 | 75 | 3.0 |
| 0 | 100 | 3.0 |

TABLE 9

$C_1$_DOWN

| leaf_num | $attr_1$ | count |
|---|---|---|
| 0 | 15 | 4.0 |
| 0 | 60 | 3.0 |
| 0 | 62 | 3.0 |
| 0 | 65 | 2.0 |
| 0 | 75 | 1.0 |

TABLE 10

$C_2$_DOWN

| leaf_num | $attr_1$ | count |
|---|---|---|
| 0 | 15 | 1.0 |
| 0 | 60 | 1.0 |
| 0 | 62 | 0.0 |
| 0 | 65 | 0.0 |
| 0 | 75 | 0.0 |

Fifth, the SLIM classifier 114 generates the GINI_VALUE view with the gini index values of each split value of attribute i. Table 11 illustrates this view.

TABLE 11

GINI_VALUE

| leaf_num | $attr_1$ | count |
|---|---|---|
| 0 | 15 | 0.22856 |
| 0 | 60 | 0.40474 |
| 0 | 62 | 0.21428 |
| 0 | 65 | 0.34284 |
| 0 | 75 | 0.42856 |

Sixth, the SLIM classifier 114 generates the MIN_GINI view for the salary attribute. Table 12 illustrates this view.

TABLE 12

MIN_GINI
after $attr_1$ is evaluated

| leaf_num | attr_name | attr_value | gini |
|---|---|---|---|
| 0 | 1 | 62 | 0.21428 |

At this point, the MIN_GINI table contains the best split value with respect to the salary attribute. Then, the above procedure is repeated for the age attribute, and one or more rows is added to the MIN_GINI table. Table 13 illustrates the updated table.

TABLE 13

MIN_GINI after
$attr_1$ and $attr_2$ are evaluated

| leaf_num | attr_name | attr_value | gini |
|---|---|---|---|
| 0 | 1 | 62 | 0.21428 |
| 0 | 2 | 30 | 0.21428 |

Normally, at this point, the SLIM classifier 114 selects the best split value based on the split value of an attribute with the lowest corresponding gini index value. Because both attributes achieve the same gini index value in this example, either one can be selected. The SLIM classifier 114 stores the best split values in each leaf node of the tree( the root node in this phase).

According to the best split value found, the SLIM classifier 114 grows the tree and partitions the training set. The partition is reflected as the leaf_num changes in the DETAIL table. Also, any new grown node that is pure or sufficiently small is marked and reassigned a special leaf_num value STOP so that the SLIM classifier 114 does not need to process it any more. The updated DETAIL table is shown in Table 14.

TABLE 14

DETAIL after phase 2

| $attr_1$ | $attr_2$ | class | leaf_num |
|---|---|---|---|
| 65K | 30 | Safe | 1 |
| 15K | 23 | Risky | 1 |
| 75K | 40 | Safe | 2→STOP |
| 15K | 28 | Risky | 1 |
| 100K | 55 | Safe | 2→STOP |

TABLE 14-continued

DETAIL after phase 2

| attr$_1$ | attr$_2$ | class | leaf_num |
|---|---|---|---|
| 60K | 45 | Safe | 2→STOP |
| 62K | 30 | Risky | 1 |

After this, the SLIM classifier 114 follows the above procedure for the DETAIL table until all the nodes in the classification tree 200 become STOP nodes.

The final classification tree 200 is shown in FIG. 2, and the final DETAIL table is shown in Table 15.

TABLE 15

Final DETAIL

| attr$_1$ | attr$_2$ | class | leaf_num |
|---|---|---|---|
| 65K | 30 | Safe | 4→STOP |
| 15K | 23 | Risky | 3→STOP |
| 75K | 40 | Safe | STOP |
| 15K | 28 | Risky | 3→STOP |
| 100K | 55 | Safe | STOP |
| 60K | 45 | Safe | STOP |
| 62K | 30 | Risky | 3→STOP |

Experimental Results

There are two important metrics to evaluate the quality of a: classification accuracy and classification time.

Since Mehta and Shafer are the only published papers on a scalable classifier dealing with large training sets, experimental results from the SLIM classifier 114 are compared with their method.

Although the SLIM classifier 114 uses different methodology to build the classifier, the SLIM classifier 114 uses the same measurement(gini index) to choose the best split value for each node. Also, the SLIM classifier 114 grows the classification tree 200 in a breath first fashion and prunes the classification tree 200 using the same pruning method as Mehta and Shafer. This insures the SLIM classifier 114 generates the same classification tree as that produced by Mehta and Shafer for the same training set. The accuracy of SPRINT and SLIQ are discussed in Mehta and Shafer.

For scaling experiments, a prototype was run on large data sets. The main cost of the SLIM classifier 114 is that it needs to access DETAIL N times(N is the number of attributes) at each level of the growth of the classification tree 200. It is recommended that future DBMSs 108 support multiple GROUP BY statements so the DETAIL table can be accessed only once regardless of the number of attributes.

Due to the lack of a classification benchmark, the synthetic database is used that was proposed in R. Agrawal, T. Imielinski, and A. Swami, *Database Mining: A Performance Perspective*, IEEE Transactions on Knowledge and Data Engineering, December 1993, [hereinafter Agrawal], which is incorporated by reference herein.

In this synthetic database, each row consists of nine attributes as shown in Table 16.

TABLE 16

Description of the synthetic data

| attribute | value |
|---|---|
| salary | uniformly distributed from 20K to 150K. |
| commission | salary $\geq$ 74K → commission = 0 else uniformly distributed from 10K to 75K |
| age | uniformly distributed from 20 to 80 |
| loan | uniformly distributed from 0 to 500K |
| elevel | uniformly chosen from 0 to 4 |
| car | uniformly chosen from 1 to 20 |
| zipcode | uniformly chosen from 9 available zipcode |
| hvalue | uniformly distributed from 0.5k100000 to 1.5k100000 where k $\in$ {0 . . . 9} depends on zipcode |
| hyear | uniformly distributed from 1 to 30 |

Ten classification functions are proposed in Agrawal to produce databases with different complexities. The prototype is run using function 2, described below. Two classes of databases can be generated: Group A and Group B. The description of the predicate for group A is shown below.

Function 2-Group A
((age<40)^(50K$\leq$salary$\leq$100K))V
((40$\leq$age<60)^(75K$\leq$salary$\leq$125K))V
((age$\geq$60)^(25K$\leq$salary$\leq$75K)

Experiments were conducted using IBM's DB2 RDBMS 108. Training sets with sizes ranging from 0.5 million rows to 3 million rows were used. The experimental results indicate that the SLIM classifier 114 achieves linear scalability with respect to the training set size. Moreover, the time per example curve stays flat when the training size increases. This is the first flat curve seen for any classifier built for large data sets.

The SLIM classifier 114 exhibits properties of a truly linear classifier. It scales in such a way that the time per example remains the same. This desirable property of linear scaling may be attributed to conversion of classification(a data mining problem) into a multi-dimensional analysis problem and to exploitation of true DBMS technology. Additionally, it was found that attribute names in DETAIL became table names for the dimension tables and that it was an attributes value pair that determined the next processing step.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for classifying set-oriented data in a computer by generating a classification tree, the computer being coupled to a data storage device for storing the set-oriented data, the method comprising the steps of:

storing the set-oriented data as a table in a relational database in the data storage device coupled to the computer, the table being comprised of rows having attributes and node identifiers, wherein each node identifier indicates a node in the classification tree to which a row belongs;

iteratively performing a sequence of steps in the computer until all of the rows have been classified, the sequence of steps comprising:

determining a gini index value for each split value of
each attribute for each node that can be partitioned in
the classification tree;

selecting an attribute and a split value for each node
that can be partitioned based on the determined gini
index value corresponding to the split value of the
attribute; and growing the classification tree by a new level based on the
selected attribute and split value for each node that can
be partitioned, further comprising:
using the node identifier associated with a row to
locate a node in the classification tree:
identifying the selected split value for that node;
applying the split value to the row; and
updating the node identifier according to the result of
the split test.

2. The method of claim 1 wherein the step of determining a gini index value further comprises the step of creating an attribute table for each attribute.

3. The method of claim 1 wherein the step of determining a gini index value further comprises the step of collecting distribution information for each attribute.

4. The method of claim 3 wherein each row has an associated class and wherein the step of collecting distribution information for each attribute further comprises the step of obtaining classification information for each class of each attribute.

5. The method of claim 1 wherein the step of selecting an attribute and a split value further comprises the step of selecting the split value of the attribute with a lowest gini index value.

6. The method of claim 1 further comprising providing a leaf node list in a memory coupled to the computer, the leaf node list having one or more entries, each entry associating a node of the classification tree with a row in the table.

7. The method of claim 6 wherein the step of growing the classification tree further comprises updating the leaf node list.

8. An apparatus for classifying set-oriented data, comprising:
a computer coupled to a data storage device for storing the set-oriented data;
means, performed by the computer, for storing the set-oriented data as a table in a relational database in the data storage device coupled to the computer, the table being comprised of rows having attributes and node identifiers, wherein each node identifier indicates a node in the classification tree to which a row belongs; and
means, performed by the computer, for performing a sequence of steps in the computer until all of the rows of the table have been classified in a classification tree, further comprising:
means, performed by the computer, for determining a gini index value for each split value of each attribute for each node that can be partitioned in the classification tree;
means, performed by the computer, for selecting an attribute and a split value for the attribute for each node that can be partitioned based on the determined gini index value corresponding to the split value of the attribute; and
means, performed by the computer, for growing the classification tree by a new level based on the selected attribute and split value for each node that can be partitioned, further comprising:
means, performed by the computer, for using the node identifier associated with a row to locate a node in the classification tree;
means, performed by the computer, for identifying the selected split value for that node;
means, performed by the computer, for applying the split value to the row; and
means, performed by the computer, for updating the node identifier according to the result of the split test.

9. The apparatus of claim 8 wherein the means for determining a gini index value further comprises means for creating an attribute table for each attribute.

10. The apparatus of claim 8 wherein the means for determining a gini index value further comprises means for collecting distribution information for each attribute.

11. The apparatus of claim 10 wherein each row has an associated class and wherein the means for collecting distribution information for each attribute further comprises means for obtaining classification information for each class of each attribute.

12. The apparatus of claim 8 wherein the means for selecting an attribute and a split value further comprises means for selecting the split value of the attribute with a lowest gini index value.

13. The apparatus of claim 8 further comprising means for providing a leaf node list in a memory coupled to the computer, the leaf node list having one or more entries, each entry associating a node of the classification tree with a row in the table.

14. The apparatus of claim 13 wherein the means for growing the classification tree further comprises means for updating the leaf node list.

15. A program storage device, readable by a computer, tangibly embodying one or more programs of instructions executable by the computer to perform method steps of a classification method for classifying set-oriented data by generating a classification tree, the computer the computer being coupled to a data storage device for storing the set-oriented data, the method comprising the steps of:
storing the set-oriented data as a table in a relational database in the data storage device coupled to the computer, the table being comprised of rows having attributes and node identifiers, wherein each node identifier indicates a node in the classification tree to which a row belongs; and
iteratively performing a sequence of steps in the computer until all of the rows have been classified, the sequence of steps comprising:
determining a gini index value for each split value of each attribute for each node that can be partitioned in the classification tree;
selecting an attribute and a split value for each node that can be partitioned based on the determined gini index value corresponding to the split value of the attribute; and
growing the classification tree by a new level based on the selected attribute and split value for each node that can be partitioned, further comprising:
using the node identifier associated with a row to locate a node in the classification tree;
identifying the selected split value for that node;
applying the split value to the row; and
updating the node identifier according to the result of the split test.

16. The program storage device of claim 15 wherein the step of determining a gini index value further comprises the step of creating an attribute table for each attribute.

17. The program storage device of claim 15 wherein the step of determining a gini index value further comprises the step of collecting distribution information for each attribute.

18. The program storage device of claim 17 wherein each row has an associated class and wherein the step of collecting distribution information for each attribute further comprises the step of obtaining classification information for each class of each attribute.

19. The program storage device of claim 15 wherein the step of selecting an attribute and a split value further comprises the step of selecting the split value of the attribute with a lowest gini index value.

20. The program storage device of claim 15 further comprising providing a leaf node list in a memory coupled to the computer, the leaf node list having one or more entries, each entry associating a node of the classification tree with a row in the table.

21. The program storage device of claim 20 wherein the step of growing the classification tree further comprises updating the leaf node list.

* * * * *